United States Patent [19]
Gray et al.

[11] 4,007,758
[45] Feb. 15, 1977

[54] RESPIRATOR PRESSURE-DEMAND EXHALATION VALVE

[75] Inventors: Robert E. Gray, Pittsburgh; Leslie F. Boord, Elizabeth, both of Pa.

[73] Assignee: Mine Safety Appliances Company, Pittsburgh, Pa.

[22] Filed: Jan. 14, 1976

[21] Appl. No.: 648,915

[52] U.S. Cl. .................. 137/472; 137/543.21; 137/543.23
[51] Int. Cl.² ........................ F16K 17/20
[58] Field of Search ......... 137/469, 472, 543.21, 137/543.23; 128/142.2

[56] References Cited
UNITED STATES PATENTS

| | | | |
|---|---|---|---|
| 1,214,595 | 2/1917 | Sands | 137/543.23 |
| 2,401,237 | 5/1946 | Gamble | 137/543.23 X |
| 2,449,683 | 9/1948 | Akerman | 137/543.21 |

*Primary Examiner*—Harold W. Weakley
*Attorney, Agent, or Firm*—Brown, Murray, Flick & Peckham

[57] ABSTRACT

A chamber in a valve case has an inlet port of exhaled air in one of its end walls. Spaced inwardly from the side wall of the chamber is a valve seat surrounding the inlet port and engaged by one side of a sealing member, the opposite side of which is engaged by a rigid disc secured to a valve stem that extends through the port and into guiding means for the stem. The diameter of the disc is nearly as great as the diameter of the chamber. A spring in the case is compressed between the disc and the other end wall of the valve chamber for pressing the sealing member against the seat. The disc is spaced from the ported wall of the chamber far enough for the marginal portion of the disc that extends laterally out beyond the sealing member to be inclined toward the ported wall but spaced from it. The side wall of the chamber is provided with exhaust slots extending around the disc and having inner walls adjacent the ported wall lying in a plane substantially coinciding with the plane in which lies the edge of the disc, and the space between the valve seat and the side wall of the case is always open to the slots.

8 Claims, 5 Drawing Figures

RESPIRATOR PRESSURE-DEMAND EXHALATION VALVE

A pressure-demand respiratory system provides protection to a user by maintaining positive facepiece pressure during inhalation, while allowing use of a demand regulator that conserves gas usage. The exhalation valve for such a system, in conjunction with a pressure-demand regulator, is supposed to maintain the positive pressure in the facepiece. There should be no leakage through the valve, as that would cause depletion of the gas in the system. At the same time, the valve should have low restriction to exhalation flows. In other words, a pressure-demand exhalation valve must provide enough restriction at pressures below the preset cracking pressure to maintain a seal against leakage of gas from the facepiece under static conditions. On the other hand, under conditions of high exhalation flows, the valve should offer a low flow restriction (the measure of flow restriction being the pressure required in the facepiece to permit high flow, such as 300 liters per minute, through the valve). The ideal pressure-demand exhalation valve would be one where the facepiece pressure at high exhalation flow is the same as the cracking pressure of the valve, so the best actual valve is one that approaches this ideal condition as closely as possible.

A number of different approaches have been taken in past designs to approach this ideal condition. The simplest approach is a valve incorporating a spring that presses a valve member against the valve seat. The spring force opposes the facepiece pressure and thereby holds a positive pressure in the facepiece. However, with such a valve there are relatively high flow restrictions at high exhalation flow rates, and the valve member is unstable during exhalation, thereby causing chattering that is heard and felt by the user. Other designs of pressure-demand exhalation valves have incorporated complex springs and pressure-balancing devices to aid in completely opening the valves in order to reduce flow restrictions, but such valves require a large number of relatively complex components with a resultant high cost to produce the valves.

It is among the objects of this invention to provide a respirator pressure-demand exhalation valve that is simple and inexpensive in construction, that will hold a positive pressure in a facepiece without leakage, that has low restriction to exhalation flows, and that has improved performance over other simple valve designs and some of the more complex designs that are known.

The preferred embodiment of the invention is illustrated in the accompanying drawings, in which FIG. 1 is a side view of a respirator mask provided with the novel exhalation valve;

Figure 1:
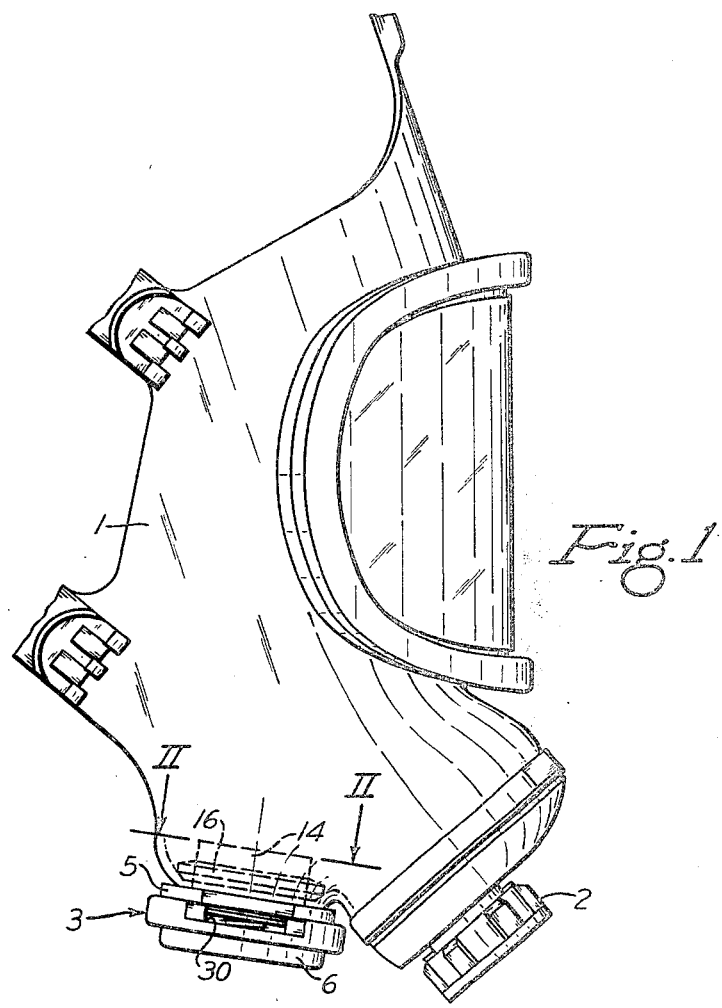

Referring to FIG. 1 of the drawings, a facepiece 1 is shown that fits tightly over the face so that leakage will not occur around its edge. The facepiece is provided with an inlet 2 connected with a suitable pressure-demand regulator (not shown) for maintaining a positive pressure, such as 1.5 inches of water, inside the facepiece. The facepiece also is provided with an outlet, in which the pressure-demand exhalation valve 3 of this invention is mounted. This valve will not open until the desired pressure in the facepiece is exceeded.

Figure 3:
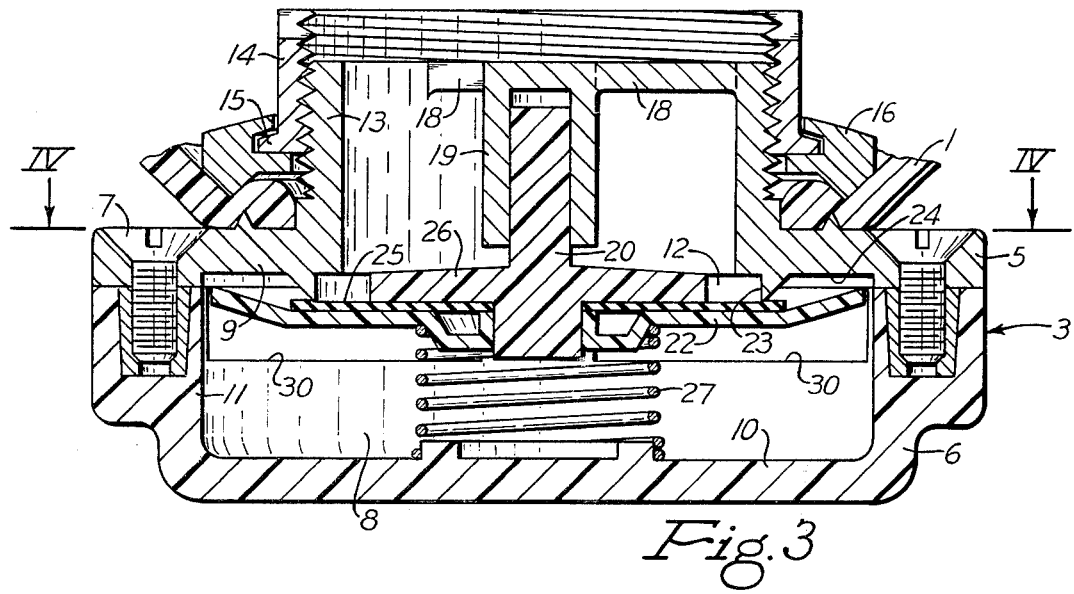
FIG. 3 is a vertical section taken on the line III—III of FIG. 2.

In accordance with this invention and as shown best in FIG. 3, the exhalation valve includes a case formed from a valve body 5 and a cover 6 that are held tightly together by means of screws 7, preferably not more than four. The valve body and cover are of such shape that a valve chamber 8 is formed inside the case. Preferably, the chamber is circular, with two end walls 9 and 10 surrounded by a side wall 11. The end wall 9 nearest the facepiece, herein referred to as the inner wall, is provided with a central inlet port 12 for air exhaled from the facepiece. This port is encircled by a flange 13 that extends away from the encircling end wall and into the outlet of the face-piece. The outside of the flange may be provided with a screw thread that receives a retaining nut 14 inside the facepiece. One end of the nut is encircled by a flange 15 that projects into an annular recess in a retaining ring 16. Tightening of the nut on the valve causes the ring to press the facepiece tightly against the valve case to form a seal. If flange 13 is not threaded, it can be held in the facepiece by a clamping ring encircling the portion of the facepiece surrounding the flange.

Figure 2:
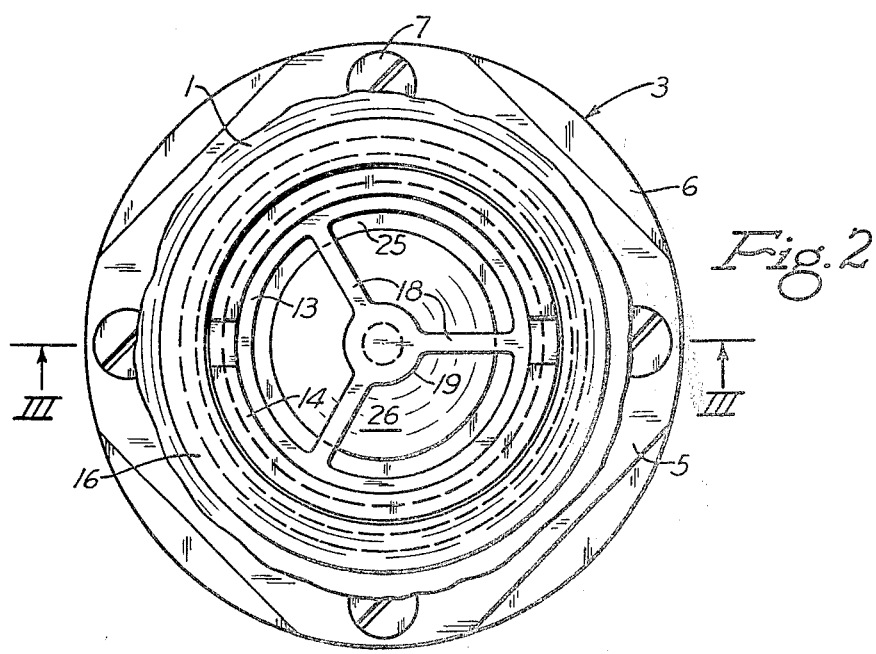
FIG. 2 is an enlarged plan view of the valve taken on the line II—II of FIG. 1.
Figure 4:
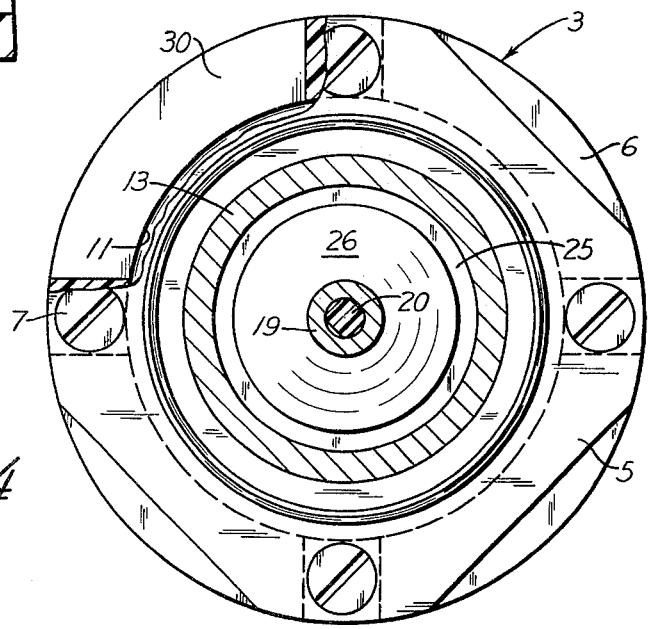
FIG. 4 is a horizontal section taken on the line IV—IV of FIG. 3.

The inner end of flange 13 is provided with inwardly extending radial ribs 18 (FIGS. 2 and 3) that support a central sleeve 19, in which a valve stem 20 can slide. As shown in FIG. 4, the inside of the sleeve is circular, but the valve stem preferably is square in order to reduce friction between it and the sleeve and to prevent possible build-up of foreign matter between the stem and sleeve, which would affect the operation of the valve. The stem extends through the inlet port of the valve and into the valve chamber 8 in the case.

Rigidly mounted on the end of the valve stem inside the case is the central portion of a rigid disc 22 that has a diameter nearly as great as that of the valve chamber so that there is only a slight clearance between them, such as of the order of 0.025 inch. The disc overlies a valve seat 23 surrounding the inlet port 12 and spaced from the side wall 11 of the valve chamber to provide an annular area 24 around the seat. A sealing member, preferably a rubber disc 25, is disposed between the rigid disc and the valve seat in engagement with both for movement with them. To hold the sealing disc in place, the valve stem can be provided with a radial flange 26, between which and the rigid disc 22 the sealing disc is located. A coil spring 27 is compressed between the rigid disc and the outer end wall 10 of the case to normally cause that disc to press the sealing member against the valve seat.

As shown in FIG. 3, the central portion of rigid disc 22 is spaced from inner end wall 9 of the valve chamber far enough for the marginal portion of the disc that extends laterally out beyond the valve seat and across annular area 24 to be inclined toward wall 9. The most convenient way of creating this spacing is to employ a raised valve seat 23 as shown. The edge of the rigid disc is spaced from end wall 9 a distance about half the depth of the valve seat. Preferably, the inclined marginal portion of the disc extends at an angle of about 15° to the axis of the valve stem.

The side of the case is provided with a plurality of exhaust slots 30 through it that extend around the disc and have inner walls adjacent the inner wall of the case.

The outer walls of the slots, of course, are closer to the outer end wall of the valve chamber. Preferably, there are only as many slots as there are screws 7, with each slot extending as far as possible between the screws at its opposite ends. The inner walls of the slots are substantially straight, as viewed in FIG. 3, and they lie in a plane that coincides, or nearly coincides, with the plane in which lies the edge of the disc 22 that is closest to the inner wall 9 of the valve chamber. Consequently, both that edge and the inner walls of slots 30 are located substantially the same distance from the inner wall of the chamber. The area 24 between the valve seat and the side wall of the chamber is always open to the exhaust slots, so it is at atmospheric pressure.

Figure 5:
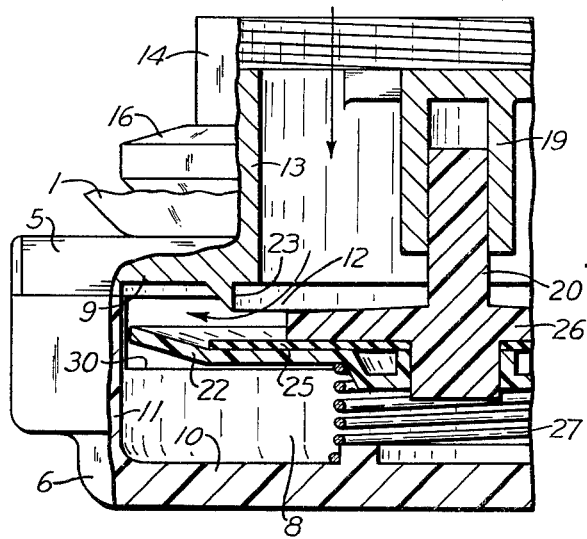
FIG. 5 is a fragmentary vertical section showing the valve open during exhalation.

In a valve that has been made in accordance with this invention the diameter of the valve seat is 1 inch, so the area of the movable valve member exposed to the pressure in the facepiece while the valve is closed is 0.785 square inches. With the diameter of rigid disc 22 approximately 1½ inches, the area of that disc exposed to air flow when the valve is opened becomes approximately 1.7 square inches. This allows the facepiece pressure to act on a much larger area of the valve disc after cracking, thereby increasing the force lifting the valve against the spring force. In fact, the relatively small area inside the valve seat, which controls cracking pressure, is substantially doubled as soon as the valve is cracked. The moment the valve is cracked, the momentum or velocity of the escaping exhaled air aids in opening the valve as shown in FIG. 5. Due to the shape of the valve disc and its relation to the inner wall of the valve chamber, a small air pocket is created in the area 24 under the disc, which provides smooth operation of the valve during exhalation. Since the exhaust slots are spaced from the inner end wall of the valve chamber, area 24 is encircled by a short side wall which causes turbulence of the air in area 24. The result is that the rapidly escaping exhaled air increases the lifting force against the valve by adding a momentum vector as the air exits into the exhaust slots. This momentum vector acts in a direction opposing the valve-spring force. Since the periphery of the valve disc is close to the side of the valve chamber, the slight restriction formed between the edge of the disc and the inner walls of the valve slots tends to hold an air pocket above the disc. The action of this valve is such that it does not snap shut just before termination of exhalation and cut off exhalation before the user is through exhaling. Such a disadvantage would occur if the gasoline control valve shown in Willson U.S. Pat. No. 1,964,616, for example, were used as an exhalation valve. The flat disc 55 in the patented valve is encircled by a solid wall during much of the movement of the disc, which causes pressure build-up after the valve is cracked open, thereby causing the valve to snap completely open. When the pressure behind the disc decreases, the valve snaps shut. This type of action is desirable in a relief valve, but not in an exhalation valve because the snapshut action occurs as exhalation flow decreases. The valve disclosed in this application does not behave in that manner, but closes gradually as exhalation ceases.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A pressure-demand exhalation valve for a respirator facepiece, the valve comprising a case provided with a chamber having spaced end walls surrounded by a side wall, one of said end walls being provided with an inlet port for exhaled air, a valve seat surrounding said port and spaced inwardly from said side wall, a sealing member having one side normally engaging said seat, a rigid disc engaging the opposite side of the sealing member and connected thereto, the diameter of the disc being nearly as great as the diameter of said chamber, a valve stem secured to the central portion of said disc and extending through said port, guide means for the valve stem connected with the case, and a spring in said chamber compressed between said disc and the other end wall of the chamber for normally pressing the sealing member against said seat, the disc being spaced from said one wall of the chamber far enough for the marginal portion of the disc that extends laterally out beyond the valve seat to be inclined toward said one wall but spaced therefrom, the side wall of said chamber being provided with a plurality of exhaust slots extending around said disc and having inner walls adjacent said one wall of the case lying in a plane substantially coinciding with the plane in which lies the edge of the disc that is closest to said one wall of the case, and the space between said valve seat and the side wall of the case always being open to said slots.

2. A pressure-demand valve according to claim 1, in which said valve seat is raised to effect said spacing of said disc from said one wall of the chamber.

3. A pressure-demand valve according to claim 1, in which the width of said slots is greater than the maximum movement of said disc when the valve is opened.

4. A pressure-demand valve according to claim 1, including a flange extending radially outwardly from said stem, and said sealing member being a disc sandwiched between said flange and rigid disc.

5. A pressure-demand valve according to claim 1, in which said marginal portion of said disc is inclined at an angle of approximately 15° to the axis of said stem.

6. A pressure-demand valve according to claim 1, in which the diameter of said disc is approximately 0.05 inch less than the diameter of said chamber.

7. A pressure-demand valve according to claim 1, in which said case includes a flange surrounding said inlet port and extending outwardly away from said one wall of the case for insertion in a facepiece opening, and said guide means is a stem receiving sleeve inside said flange and supported therefrom.

8. A pressure-demand valve according to claim 7, in which said flange is provided with an external screw thread for receiving a retaining nut for attaching the valve to a facepiece.

* * * * *